United States Patent [19]

Yeung et al.

[11] Patent Number: 5,721,313
[45] Date of Patent: Feb. 24, 1998

[54] CROSSLINKED POLYMER COMPOSITION

[75] Inventors: Dominic Wai-Kwing Yeung, Mississauga; Dipak Lad, Brampton, both of Canada

[73] Assignee: Rhone-Poulenc Inc., Cranbury, N.J.

[21] Appl. No.: 556,774

[22] Filed: Nov. 2, 1995

[51] Int. Cl.⁶ ............ C08L 35/02; C08L 39/00; C08L 41/00
[52] U.S. Cl. ............ 524/814; 8/528; 149/108.8; 149/109.4; 252/308; 252/309; 252/315.3; 260/DIG. 38; 507/226; 507/903; 510/476; 524/555; 524/808; 524/817; 525/932
[58] Field of Search ............ 252/308, 309; 507/226, 903; 525/287, 932; 260/DIG. 38; 8/528; 524/457, 808, 814, 817; 149/108.8, 109.4; 510/476

[56] References Cited

U.S. PATENT DOCUMENTS

| | | | |
|---|---|---|---|
| 3,768,565 | 10/1973 | Persinski et al. | 166/308 |
| 3,898,037 | 8/1975 | Lange et al. | 510/476 X |
| 3,946,139 | 3/1976 | Bleyle et al. | 524/817 X |
| 3,978,016 | 8/1976 | Perronin et al. | 8/558 |
| 4,397,984 | 8/1983 | Wendel et al. | 524/814 |
| 4,558,092 | 12/1985 | Reinecke et al. | 524/817 |
| 4,592,850 | 6/1986 | Castner | 507/226 |
| 4,623,689 | 11/1986 | Shintani et al. | 524/457 |
| 4,670,165 | 6/1987 | Black et al. | 252/8.551 |
| 4,676,930 | 6/1987 | Shu et al. | 252/315.3 |
| 4,861,499 | 8/1989 | Neff et al. | 507/226 X |
| 5,185,395 | 2/1993 | Robinson et al. | 524/457 |

FOREIGN PATENT DOCUMENTS

| | | | |
|---|---|---|---|
| 0 186 361 | 7/1986 | European Pat. Off. | D06P 1/52 |
| 0 196 162 | 10/1986 | European Pat. Off. | C08J 3/02 |
| 0 280 083 | 8/1988 | European Pat. Off. | E21B 43/25 |
| 2 077 750 | 12/1981 | United Kingdom | C08L 33/26 |

*Primary Examiner*—Richard D. Lovering
*Attorney, Agent, or Firm*—Andrew M. Solomon

[57] ABSTRACT

A composition comprising a water-in-oil polymer emulsion wherein the polymer is the reaction product of the following:

(a) an ethylenically unsaturated carboxylate having between about 3 and about 6 carbon atoms;

(b) an ethylenically unsaturated monomer which is non-ionic in nature;

(c) an ethylenically unsaturated monomer containing one or more sulfonate or sulfoalkyl groups;

(d) an ethylenically unsaturated monomer having surface active properties; and (e) a crosslinking agent is provided. The composition has a multiple number of uses, such as in ink, pigment or dye thickening.

12 Claims, No Drawings

CROSSLINKED POLYMER COMPOSITION

BACKGROUND OF THE INVENTION

1. Field of the Invention

The present invention relates to a polymer composition which has multiple utilities. More particularly, the present invention relates to a water-in-oil polymer emulsion including a polymer composition which is derived from acrylic or methacrylic acid, acrylamide and an ethylenically unsaturated monomer containing sulfonate groups, and a surface active monomer wherein the polymer is crosslinked in emulsion form. The composition has specific utility as an ink, pigment or dye thickener. 2. Technology Description Examples of potentially relevant prior art publications include the following: U.S. Pat. No. 4,670,165; EP 0280083; U.S. Pat. No. 4,676,930; EP 0196162; EP 0186361; GB 2077750; and U.S. Pat. No. 3,978,016.

Despite the above teachings, there still exists a need in the art for a novel composition which includes a polymer composition produced from the copolymerization of the following starting materials: an ethylenically unsaturated carboxylate having between about 3 and about 6 carbon atoms; an ethylenically unsaturated monomer which is nonionic in nature; an ethylenically unsaturated monomer containing sulfonate or sulfoalkyl groups; an ethylenically unsaturated monomer having surface active properties and a crosslinking agent.

BRIEF SUMMARY OF THE INVENTION

In accordance with the present invention a novel composition is provided. The composition comprises a polymer emulsion wherein the polymer is the reaction product of the following:

(a) an ethylenically unsaturated carboxylate having between about 3 and about 6 carbon atoms;

(b) an ethylenically unsaturated monomer which is nonionic in nature;

(c) an ethylenically unsaturated monomer containing one or more sulfonate or sulfoalkyl groups;

(d) an ethylenically unsaturated monomer having surface active properties; and (e) a crosslinking agent.

In particularly preferred embodiments, (a) is the ammonium or sodium salt of acrylic acid; (b) is acrylamide; (c) is the ammonium or sodium salt of 2-acrylamido-2-methylpropane sulfonic acid; (d) is behenyl methacrylate: and (e) is N,N-methylenebisacrylamide. The polymer is produced by forming a water-in-oil emulsion of the above reactants.

The above polymer, which is in a water in oil emulsion form may be then activated in water and used for one or more of the following applications: ink, pigment or dye thickener (textile or paper), adhesive, detergent, paint, cosmetic, printing paste (textile or paper), cleaner, explosive chemical, carpet backing or oil field chemical.

An object of the present invention is to provide a novel polymer composition which has multiple uses.

Still another object of the present invention is to provide an ink, pigment or dye thickener (textile or paper), adhesive, detergent, paint, cosmetic, printing paste (textile or paper), cleaner, explosive chemical, carpet backing or oil field chemical including the above-defined novel polymer.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention is directed to a novel polymer which is the reaction product of the following:

(a) an ethylenically unsaturated carboxylate having between about 3 and about 6 carbon atoms;

(b) an ethylenically unsaturated monomer which is nonionic in nature;

(c) an ethylenically unsaturated monomer containing one or more sulfonate or sulfoalkyl groups;

(d) an ethylenically unsaturated monomer having surface active properties; and (e) a crosslinking agent.

The polymer composition is typically present in the interior phase of a water-in-oil emulsion. The polymer composition typically comprises from about 1 to about 70 percent by weight of the final emulsion, more preferably from about 20 to about 50 percent by weight of the final emulsion and most preferably from about 25 to about 35 percent by weight of the final emulsion.

The first component (a) which is used to form the polymer of the claimed invention comprises an ethylenically unsaturated carboxylate having between about 3 and about 6 carbon atoms. Included in this class of compounds are the acid salts (i.e., sodium, ammonium or potassium salts) of acrylic acid, methacrylic acid, itaconic acid, maleic acid and fumaric acid and mixtures thereof. The sodium, potassium or ammonium salt of acrylic acid is particularly preferred.

The amount of component (a) present typically comprises between about 50 and about 90 percent by weight of the polymer solids in the emulsion, more preferably comprises between about 60 and about 80 percent by weight of the polymer solids in the emulsion, and most preferably between about 70 and about 80 percent by weight of the polymer solids in the emulsion.

The second component (b) which is used to form the polymer of the present invention is an ethylenically unsaturated monomer which is nonionic in nature. Examples of component (b) include acrylamide, methacrylamide, alkyl substituted (alkyl represents an alkyl group having between 1 and about 6 carbon atoms) acrylamides such as N-butyl acrylamide, hydroxypropylacrylate, N,N-dimethylacrylamide, hydroxypropylmethacrylate, vinyl acetate and vinyl pyrollidone and mixtures thereof. In particularly preferred embodiments, component (b) comprises acrylamide.

The amount of component (b) present typically comprises between about 5 and about 48 percent by weight of the polymer solids in the emulsion, more preferably comprises between about 10 and about 30 percent by weight of the polymer solids in the emulsion, and most preferably between about 15 and about 25 percent by weight of the polymer solids in the emulsion.

The third component (c) which is used to form the polymer of the present invention is an ethylenically unsaturated monomer containing one or more sulfonate or sulfoalkyl groups. Examples of component (c) include the acid (sodium, potassium or ammonium) salt of: 2-acrylamido-2-methylpropanesulfonic acid (AMPS), 1-allyloxy-2-hydroxy-propylsulfonic acid (AHPS), vinyl sulfonic acid, 2-sulfoethyl methacrylic acid, or vinyl benzene sulfonic acid and mixtures thereof. Particularly preferred is the sodium or ammonium salt of 2-acrylamido-2-methylpropanesulfonic acid (AMPS).

The amount of component (c) present typically comprises between about 1 and about 20 percent by weight of the polymer solids in the emulsion, more preferably comprises between about 5 and about 15 percent by weight of the polymer solids in the emulsion, and most preferably between about 8 and about 12 percent by weight of the polymer solids in the emulsion.

The fourth component (d) which is used to form the polymer of the present invention is an ethylenically unsaturated monomer having surface active properties. Such a material comprises an ethylenically unsaturated monomer which has as a moiety an alkyl, alkaryl, or aryl group containing at least 6 carbon atoms. Such materials are commonly referred to as "surfmers" (i.e., polymerizable surfactants) and are generally represented by the following formula:

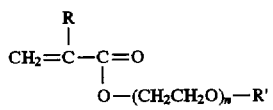

(I)

where R is H, or a C1–C4 alkyl group; R' is an alkyl, aryl or alkaryl group having more than 6 carbon atoms, and n is between 0 and 50.

A discussion on surfmers and a listing of representative materials is provided in Guyot et al., "Reactive Surfactants in Emulsion Polymerization", Advances in Polymer Science, Vol. 111, pp. 46–64, 1994. To the extent necessary for completion, this material is expressly incorporated by reference. Specific surface active monomers which may be selected include behenyl methacrylate, lauryl methacrylate, tristyryl phenol polyethylene oxy-methacrylate and stearyl methacrylate and mixtures thereof. The use of behenyl methacrylate is particularly preferred. When selected, the amount of polymer solids derived from such surface active polymers typically ranges from about 0.01 to about 5.0 percent, with amounts ranging from about 0.1 to about 3.0 percent by weight of the polymer solids being even more preferred.

The fifth (e) component used to form the polymer of the present invention comprises a crosslinking agent. The criteria for selection of such a material is that it is able to crosslink the monomers (a), (b), (c) and (d) in an aqueous environment. Typically such a material is in the nature of a polyfunctional monomer which is water soluble. Examples of crosslinking agents which may be selected include N,N-methylenebisacrylamide and the reaction product of trimethylolpropane with three moles of ethylene oxide followed by esterification with acrylic acid, with N,N-methylenebisacrylamide being particularly preferred. Mixtures of the above crosslinking agents may be used. The amount of crosslinking agent present is between about 0.01 to about 5.0 percent by weight of polymer solids, with amounts between 0.01 and 0.5 percent by weight being particularly preferred.

The polymerization reaction may take place by utilizing inverse emulsion techniques. The use of an inverse emulsion system is particularly preferred when it is necessary to produce an emulsion having high amounts of polymer solids. When forming a simple aqueous solution, the multicomponent reactants used to form the polymer tends to produce a solution having very high viscosities with a relatively low amount of polymer solids (i.e., less than 10 percent solids yields a viscosity of greater than about 25,000 cps.) Accordingly, for applications where higher levels of solids are needed (i.e., greater than 10 percent) the inverse emulsion polymerization technique should be utilized.

This technique is well documented; see, for instance CA 1304185 or U.S. Pat. No. 3,284,393. To the extent necessary for completion, these references are expressly incorporated by reference. A stable water-in-oil emulsion is composed of an aqueous phase and an organic phase. The aqueous phase comprises water and the water soluble monomers. The pH of the aqueous phase is usually in the range of about 7 to about 9 and is preferably about 8 prior to mixing with the organic phase.

The organic phase comprises a hydrocarbon solvent and a water-in-oil emulsifier of low HLB value, preferably-below 6. Any known hydrocarbon solvent may be used for this purpose but preferred hydrocarbon solvents are mineral spirits. For reasons of product safety, the mineral spirits should be of low aromatic content or free of aromatic content. Suitable solvents include those aliphatic hydrocarbon solvents commercially available under the trademarks Isopar K and Isopar M from Esso and Shell Sol 715 and Shell Sol 151, from Shell. To reduce the volatile organic contents (VOC) associated with the use of organic solvents, solvents which have a high flash point/boiling point may be selected. Such solvents are sold by Witco under the trade designations PD-23 or PD-45. These materials are sold as "white mineral oils". Other oils include naturally occurring vegetable oils and oils sold by Pennzoil under the Drakeol trade name. Processing techniques such as solvent stripping and replacement may alternatively be used to reduce the VOC.

When producing the polymer by utilizing the water-in-oil polymerization technique, the amount of solvent that the aqueous phase is added to typically comprises between about 10 to 90 percent by weight of the entire composition, and more preferably between about 15 and about 25 percent by weight of the entire composition.

Suitable water-in-oil emulsifiers include those which have a HLB of less than 6. Examples include sorbitan esters of fatty acids and a preferred one is sorbitan monooleate, which has a HLB of 4.3. This emulsifier can be used alone or blended with one or more C12 to C15 alcohols ethoxylated with, on the average, three to four ethylene oxide molecules. Other suitable emulsifiers are available from Witco under the trademark Witcomide 511. It is believed that this compound contains approximately 50% unesterified N,N-diethanol fatty amide, the fatty groups present on the emulsifier chain containing approximately 64% oleyl, 33% linoleic and 3% palmityl groups. Approximately 40% by weight of the surfactant is believed to be the monoesterified variation of the compound, the ester group containing 15 to 22 carbon atoms. Additionally, small amounts of diesterified material are also present. Also considered within the scope of the present invention are the Hypermer surfactants sold by ICI.

The polymerization initiator may take the form of many known initiators such as azo, peroxide, persulfate, perester and redox initiators. The amount of initiator added to the solution typically ranges from between about 0.05 to about 2 weight percent of the emulsion with amounts ranging from about 0.1 to about 0.5 weight percent being particularly preferred. Free radical initiators which may be selected include peroxide materials such as benzoyl peroxide, cumene hydroperoxide, hydrogen peroxide, acetyl peroxide, lauroyl peroxide and persulfates, peresters such as t-butylperoxypivalate, ∝-cumylperoxypivalate and t-butylperoctoate, and azo (azobisnitrile) type initiators (water or oil soluble) such as 2,2'-azobis-(2- methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvalero nitrile) and 2,2'-azobis-(2-amidinopropane) hydrochloride. Preferred is the use of perester and azo initiators, with ∝-cumylperoxypivalate and 2,2'-azobis-(2-methylpropanenitrile) being particularly preferred. The initiators may be added in an inert solvent such as mineral spirits, water or acetone.

To produce the novel polymer using inverse emulsion polymerization techniques a first aqueous phase is produced by adding components (a), (b), (c), (d) and (e) to water. The pH of this phase is typically between about 7 and about 9. If a chain transfer agent such as isopropyl alcohol is desired, it is typically added to this aqueous phase. The aqueous phase is added to an organic phase which includes the organic solvent and the low HLB surface active agent(s). The resulting mixture is then typically homogenized by the application of shear forces such that the particle size of the monomer emulsion is less than 500 nanometers. The polymerization initiator is added to the system by using one or more sequential additions. Polymerization takes place at ambient pressures and at a temperature between about 25 and about 45° C. under nitrogen purging. The reaction continues such that up to 99.9% of the monomers can be converted to a polymeric form.

For some applications, it may be ultimately desirable to invert the produced water-in-oil emulsion so that the aqueous phase is the continuous phase whereas the organic phase is the dispersed phase. Inversion of the water-in-oil emulsion may be accomplished by adding a surface active agent having a high HLB value. In practice, addition of a surfactant having a HLB of greater than or equal to 9 to a water-in-oil emulsion should successfully effectuate inversion. Examples of surfactants which can effectively invert the emulsion include the following: nonylphenol ethoxylates (8–15 moles EO) and octylphenol ethoxylates (8–15 moles EO). Preferred is the use of nonylphenol ethoxylates having 9 moles of ethylene oxide.

The resulting polymer emulsion may be used for a number of applications. It is believed that the presence of the sulfonate or sulfoalkyl groups and the surface active monomer in the resulting polymer provides enhanced salt tolerance and viscosity and rheology properties as compared to polymers without such groups. Included amongst the potential applications for the novel polymer emulsion are the following: ink, pigment or dye thickener (textile or paper), adhesive, detergent, paint, cosmetic, printing paste (textile or paper), cleaner, explosive chemical, carpet backing or oil field chemical.

Particularly preferred uses are as a thickener for inks and/or dyes or for use in printing pastes. When used, the viscosity of a solution of 3% of the inverted water-in-oil emulsion (27–30% solids) in water is between about 20,000 and 30,000 cps. To produce a printing paste using the inventive thickening agent, 10 parts binder and 10 parts pigment or dye are added to 80 parts of the above described 3% solution thickening agent. The resulting viscosity of the final product is about 10,000 to about 15,000 cps. Viscosity adjustment can be accomplished by subsequent addition of additional thickening agent.

The invention is described in greater detail by the following non-limiting examples.

EXAMPLE 1

Into a first vessel an aqueous phase of pH 8.5 is prepared containing 26.7 parts of water, 4.4 parts of acrylamide, 16.1 parts of acrylic acid, 5.3 parts of ammonium salt of 2-acrylamido-2-methylpropanesulfonic acid, 14.3 parts of ammonium hydroxide, 0.01 parts of Versenex 80 (a chelating agent), 0.09 parts of behenyl methacylate, 0.47 parts of 2-propanol and 0.009 parts of N,N-methylenebisacrylamide.

Into a second vessel an oil phase is prepared consisting of 21 parts mineral spirits (Shell Sol 151 commercially available from Shell), 2.3 parts sorbitan monooleate and 0.2 part C12–C15 alcohols ethoxylated with 3 moles of ethylene oxide. The aqueous phase is mixed with the oil phase and the resulting mixture is homogenized with a blender for 10 seconds to achieve a particle size of less than 500 nm. The resulting emulsion is then transferred to a reaction vessel equipped with a agitator and nitrogen inlet line. The emulsion is purged with nitrogen to remove the oxygen in the system for about 45 minutes. 0.03 part of 2,2'azobis-(2, 4-dimethylpentanenitrile) in 0.1 part of mineral spirits are added to the emulsion and the contents of the vessel are heated to 35°–40° C. An exotherm is observed and continues for about 2–4 hours. Cooling is required to maintain at this temperature. When no exotherm is noticed, the temperature is raised to 45° C. and an additional 0.009 parts 2,2'-azobis (2,4-dimethylpentanenitrile) are added. The temperature is maintained at 45° C. for 30 minutes then raised to 50° C. Once at 50° C., a third portion of 0.005 parts of 2,2'-azobis (2,4-dimethylpentanenitrile) is added and is maintained at 55° C. for 60 minutes. Then the emulsion is cooled to 25° C. and 4.8 parts of nonyl phenol ethoxylated with 9 moles of ethylene oxide are incorporated to the emulsion. The emulsion is stable and free of grit, and the viscosity is 1,640 cps (LV, #3, 60 rpm, 25° C.).

EXAMPLES 2–17

Emulsions are prepared in the same manner as Example 1 with various different compositions of (a) to (e) components. Example #16 is with Shell Sol 715 as the solvent carrier, while Example #17 is with high flash mineral oil (Witco PD-23) from Witco. Also, Examples #14 and #15 are of sodium salts instead of ammonium salts.

These Examples are listed in Table 1, with the amounts being in parts by weight.

EXAMPLE 18

A 30 g emulsion of Example #1 is added to 1,000 g of city water. The sample is homogenized with a Arde Barnico laboratory homogenizer for 10 minutes. The viscosity of this resulting 3% solution is 26,000cps (RV, #6, 20 rpm, 25° C). 240 g of this solution is taken, to which 30 g of acrylic binder latex and 30 g of Blue SRG pigment are added. The sample is mixed using a Hamilton Beach laboratory mixture for 10 minutes. This viscosity of this resulting pigment paste solution is 3,750 cps (RV, #6,20 rpm, 25° C.). An additional 3 g of emulsion of Example #1 is added to the paste solution and mixed for another 10 minutes. The viscosity of the final pigment printing paste solution is 12,500 cps (RV #6,20 rpm, 25° C.). This formulation is then coated onto a cotton-polyester type fabric by applying it through a 60 mesh nickel screen. The fabric is then dried at 350° F. for 2 minutes with a conventional oven. The printing quality was examined for its smoothness, colour yield and penetration. Example #1 gives good printing quality.

The emulsion thickeners of Examples #2–17 are evaluated as above. The results are shown in Table 2.

TABLE 1

| Example | Component A | Component B | Component C | Component D | Component E | B.V. of Resulting Emulsion (LV, #3, 60 rpm, 25° C.) |
|---|---|---|---|---|---|---|
| 2 | 83.94 | 15.94 | — | — | 0.1210 | 470 cps |
| 3 | 74.2 | 17.30 | 7.48 | 0.9660 | 0.0084 | 1620 cps |
| 4 | 66.7 | 33.3 | — | — | 0.0492 | 460 cps |
| 5 | 55.1 | 44.0 | — | 0.8796 | 0.044 | 940 cps |
| 6 | 73.7 | 25.25 | — | 0.9879 | 0.0432 | 1260 cps |
| 7 | 73.7 | 16.40 | 9.88 | — | 0.0169 | 1800 cps |
| 8 | 77.6 | 20.00 | 1.95 | 0.3491 | 0.0335 | 1650 cps |
| 9 | 78.3 | 20.81 | — | 0.8350 | 0.0333 | 1790 cps |
| 10 | 73.5 | 16.41 | 9.86 | 0.1708 | 0.0338 | 1840 cps |
| 11 | 75.5 | 16.44 | 9.86 | 0.3522 | 0.0338 | 1750 cps |
| 12 | 73.6 | 16.44 | 9.88 | — | 0.0341 | 1760 cps |
| 13 | 77.3 | 17.20 | 5.19 | 0.1704 | 0.0511 | 1860 cps |
| 14 | 74.5 | 19.76 | 9.47 | 0.1640 | 0.0325 | 900 cps |
| 15 | 78.3 | 16.54 | 5.00 | 0.1633 | 0.049 | 850 cps |
| 16 | 77.1 | 17.2 | 5.4 | 0.170 | 0.0508 | 1000 cps |
| 17 | 77.1 | 17.2 | 5.4 | 0.170 | 0.0508 | 1850 cps |

TABLE 2

| Example | Viscosity of 3% Stock Solution | Viscosity After Addition of Binder and Pigment | Viscosity of Post Addition of 1% Emulsion | Printing Quality |
|---|---|---|---|---|
| 2 | 3,500 cps | 100 cps | —(1) | — |
| 3 | 22,500 cps | 4,550 cps | 13,000 cps | good |
| 4 | 7,600 cps | 250 cps | —(1) | — |
| 5 | 17,250 cps | 2,000 cps | 4,500 cps | —(2) |
| 6 | 23,000 cps | 1,500 cps | 5,500 cps | —(2) |
| 7 | 24,500 cps | 3,000 cps | 10,000 cps | poor |
| 8 | 22,500 cps | 3,250 cps | 11,000 cps | good |
| 9 | 20,500 cps | 3,000 cps | 11,000 cps | acceptable |
| 10 | 26,000 cps | 3,750 cps | 12,500 cps | good |
| 11 | 23,000 cps | 3,000 cps | 12,000 cps | good |
| 12 | 23,000 cps | 3,500 cps | 11,750 cps | poor |
| 13 | 23,000 cps | 3,000 cps | 12,500 cps | good |
| 14 | 24,000 cps | 4,000 cps | 12,000 cps | good |
| 15 | 23,000 cps | 3,000 cps | 12,000 cps | good |
| 16 | 33,000 cps | 4,500 cps | 13,000 cps | good |
| 17 | 24,500 cps | 2,500 cps | 5,000 cps | acceptable |

(1)due to the extremely low 3% viscosity pigment formulation drawdown is not made.
(2)due to the extremely low pigment formulation viscosity drawdown is not made.

Having described the invention in detail and by reference to the preferred embodiments thereof, it will be apparent that modifications and variations are possible without departing from the scope of the appended claims.

What is claimed is:

1. A composition comprising a water-in-oil polymer emulsion wherein the polymer is the reaction product of the following:

(a) an ethylenically unsaturated carboxylate having between about 3 and about 6 carbon atoms selected from the group consisting of acrylic acid, methacrylic acid, itaconic acid, maleic acid, fumaric acid and their acid salts and mixtures thereof;

(b) an ethylenically unsaturated monomer which is nonionic in nature selected from the group consisting of acrylamide, methacrylamide, N-alkyl substituted acrylamides, hydroxypropylacrylate, N,N-dimethylacrylamide, hydroxypropylmethacrylate, vinyl acetate and vinyl pyrollidone and mixtures thereof;

(c) an ethylenically unsaturated monomer containing one or more sulfonate or sulfoalkyl groups selected from the group consisting of: 2-acrylamido-2-methylpropanesulfonic acid, 1-allyloxy-2-hydroxypropylsulfonic acid, vinyl sulfonic acid, 2-sulfoethyl methacrylic acid and vinyl benzene sulfonic acid and their acid salts and mixtures thereof;

(d) an ethylenically unsaturated monomer having surface active properties of the formula:

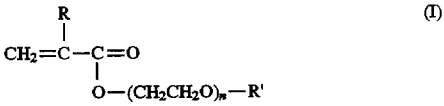

where R is H, or a C1–C4 alkyl group; R' is an alkyl, aryl or alkaryl group having more than 6 carbon atoms, and n is between 0 and 50; and (e) a crosslinking agent.

2. The composition according to claim 1 wherein (a) is the sodium, ammonium or potassium salt of acrylic acid.

3. The composition according to claim 2 wherein (b) is acrylamide.

4. The composition according to claim 3, wherein (c) is the sodium or ammonium salt of 2-acrylamido-2-methylpropanesulfonic acid.

5. The composition according to claim 4 wherein (d) is behenyl methacrylate.

6. The composition according to claim 5 wherein (e) is N,N-methylenebisacrylamide.

7. The composition according to claim 1 wherein (e) is selected from the group consisting of N,N-methylenebisacrylamide and the reaction product of trimethylolpropane with three moles of ethylene oxide followed by esterification with acrylic acid and mixtures thereof.

8. A composition consisting essentially of a water-in-oil polymer emulsion wherein the polymer is the reaction product of the following:

(a) 50 to 90 percent by weight of the sodium or ammonium salt of acrylic acid;

(b) 5 to 48 percent by weight acrylamide;

(c) 1 to 20 percent by weight of the sodium salt or ammonium salt of 2-acrylamido-2-methylpropanesulfonic acid;

(d) 0.01 to 5 percent by weight behenyl methacrylate; and (e) 0.01 to 5 percent by weight N,N-methylenebisacrylamide wherein the weight percentages are the percent by weight of the polymer solids in the emulsion.

9. An ink, pigment or dye thickener, adhesive, detergent, paint, cosmetic, paper printing paste, textile printing paste, cleaner, explosive chemical, carpet backing or oil field chemical including a composition comprising a water-in-oil polymer emulsion wherein the polymer is the reaction product of the following:

(a) an ethylenically unsaturated carboxylate having between about 3 and about 6 carbon atoms selected from the group consisting of acrylic acid, methacrylic acid, itaconic acid, maleic acid, fumaric acid and their acid salts and mixtures thereof;

(b) an ethylenically unsaturated monomer which is non-ionic in nature selected from the group consisting of acrylamide, methacrylamide, N-alkyl substituted acrylamides, hydroxypropylacrylate, N,N-dimethylacrylamide, hydroxypropylmethacrylate, vinyl acetate and vinyl pyrollidone and mixtures thereof;

(c) an ethylenically unsaturated monomer containing one or more sulfonate or sulfoalkyl groups selected from the group consisting of: 2-acrylamido-2-methylpropanesulfonic acid, 1-allyloxy-2-hydroxy-propylsulfonic acid, vinyl sulfonic acid, 2-sulfoethyl methacrylic acid and vinyl benzene sulfonic acid and their acid salts and mixtures thereof;

(d) an ethylenically unsaturated monomer having surface active properties of the formula:

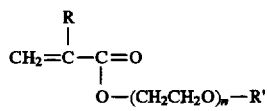

(I)

where R is H, or a C1–C4 alkyl group; R' is an alkyl, aryl or alkaryl group having more than 6 carbon atoms, and n is between 0 and 50 and (e) a crosslinking agent.

10. The chemical according to claim 9 which is an ink, pigment or dye thickener.

11. The ink, pigment or dye thickening agent according to claim 10 further comprising an ink, pigment or dye and a binder and wherein said water-in-oil polymer emulsion is inverted in water.

12. The chemical according to claim 9 wherein said polymer is the reaction product of the following:

(a) 50 to 90 percent by weight of the sodium salt or ammonium salt of acrylic acid;

(b) 5 to 48 percent by weight acrylamide;

(c) 1 to 20 percent by weight of the sodium salt or ammonium salt of 2-acrylamido-2-methylpropanesulfonic acid;

(d) 0.01 to 5 percent by weight behenyl methacrylate; and (e) 0.01 to 5 percent by weight N,N-methylenebisacrylamide wherein the weight percentages are the percent by weight of the polymer solids in the emulsion.

* * * * *